(12) United States Patent
Strater et al.

(10) Patent No.: US 11,343,122 B2
(45) Date of Patent: May 24, 2022

(54) WIRELESS EXTENDER WITH ON-BOARDING SSID FOR SIMPLE AND EXTENSIBLE ONBOARDING

(71) Applicant: ARRIS Enterprises LLC, Suwanee, GA (US)

(72) Inventors: Jay William Strater, San Diego, CA (US); Gregory Nobutaka Nakanishi, San Diego, CA (US); Ken Haase, Pleasanton, CA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 20 days.

(21) Appl. No.: 17/060,730

(22) Filed: Oct. 1, 2020

(65) Prior Publication Data

US 2021/0203527 A1 Jul. 1, 2021

Related U.S. Application Data

(60) Provisional application No. 62/955,093, filed on Dec. 30, 2019.

(51) Int. Cl.
*H04L 12/66* (2006.01)
*H04W 84/12* (2009.01)
*H04W 88/06* (2009.01)

(52) U.S. Cl.
CPC ............. *H04L 12/66* (2013.01); *H04W 84/12* (2013.01); *H04W 88/06* (2013.01)

(58) Field of Classification Search
CPC .... H04L 12/66; H04L 63/0823; H04W 84/12; H04W 88/06; H04B 7/2606
See application file for complete search history.

(56) References Cited

U.S. PATENT DOCUMENTS 9,052,711 B2 * 6/2015 Schneider .......... G05B 23/0262
10,057,813 B1 8/2018 Likar et al.
(Continued)

OTHER PUBLICATIONS

International Search Report dated Feb. 9, 2021 in International (PCT) Application No. PCT/US20/053747.

*Primary Examiner* — Mohammad S Anwar
(74) *Attorney, Agent, or Firm* — Wenderoth, Lind & Ponack, L.L.P.

(57) ABSTRACT

A gateway apparatus initiates an extender onboarding process and wirelessly transmits an onboarding SSID; and an extender apparatus for establishing a backhaul wireless communication link with the electronic apparatus, wirelessly scans for presence of the onboarding SSID, and in response to detection of the onboarding SSID, establishes an onboarding wireless communication link with the electronic apparatus based on the onboarding SSID. The extender apparatus transmits a backhaul information request via the onboarding wireless communication link, receives backhaul credentials, including a backhaul SSID, from the gateway apparatus via the onboarding wireless communication link, and after receiving the backhaul credentials, disassociates from the onboarding SSID, associates itself with the backhaul SSID, and establishes a wireless backhaul link with the electronic apparatus based on the backhaul SSID. The wireless backhaul link is different from the onboarding wireless communication link, and use of the wireless backhaul link requires the backhaul SSID.

22 Claims, 7 Drawing Sheets

(56) References Cited

U.S. PATENT DOCUMENTS

| | | | |
|---|---|---|---|
| 2011/0210952 A1* | 9/2011 | Safavi | G09F 21/048 |
| | | | 345/207 |
| 2018/0183666 A1 | 6/2018 | Likar et al. | |
| 2018/0191565 A1* | 7/2018 | Cooppan | H04L 41/0809 |
| 2019/0074970 A1 | 3/2019 | Clancy et al. | |
| 2019/0101091 A1* | 4/2019 | Baxendale | F02N 11/087 |
| 2020/0204974 A1 | 6/2020 | Strater et al. | |

* cited by examiner

FIG. 7

WIRELESS EXTENDER WITH ON-BOARDING SSID FOR SIMPLE AND EXTENSIBLE ONBOARDING

BACKGROUND

Use of wireless electronic devices is more and more prevalent both through the expanded ownership of smart phones and through the addition of wirelessly connected apparatuses, such as appliances, i.e., the coming of the so called internet of things. Thus, the area that needs to be covered in a residence or business continues to expand, leading to more common use of wireless, e.g. Wi-Fi, extenders, which serve to extend the physical area covered by the Wi-Fi that originates from the gateway apparatus, e.g., the residential gateway (RG), which connects to the internet and provides a gateway or access to the internet via the wireless signal scheme promulgated in the home or business by the gateway apparatus.

According to current technology, when a user pairs an electronic device with the gateway apparatus, the user must typically push a button, e.g., the WPS button, on gateway and also push a button on the electronic device to be paired and on the gateway apparatus, and the button pushes must be done within a predetermined period of time, after which the pairing operation times-out. The same operation is used for adding, i.e., pairing, an extender. However, because of the nature of the extender needing to be physically distant from the gateway apparatus, the known two button procedure of pushing a button on both the gateway apparatus and the electronic device within a predetermined time period is problematic due to the necessity of the user physically moving between the locations of the two devices within the predetermined period. Further, aside from the increased possibility of running into a time out, the mere necessity of walking from one location to the other to accomplish the pairing is inconvenient.

In another example, credential information for a new wireless extender can be pre-provisioned in home network devices such that, when adding a wireless extender, a home network device is able to recognize it and provision the wireless extender with its backhaul information.

In another example, a user can be provided with an application on their mobile phone that uses Bluetooth Low Energy (BLE) communication as an out-of-band channel with a home network device and a new wireless extender to provision the new wireless extender with its backhaul information.

However, all the possible approaches for onboarding a new wireless extender mentioned above have drawbacks. Any pre-provisioning solution is typically only available for operators and requires complex back-office provisioning logic. A BLE solution requires BLE support for home network devices and mobile devices having applications. Additionally, the WPS solution requires a user to physically push a WPS button on devices, which could be located in different rooms of the home.

SUMMARY

In order to eliminate the inconvenience and time out problems of the prior art two button pairing procedure, the wireless (e.g., Wi-Fi) extender, wireless network system, and method disclosed herein includes circuitry and/or processing to accomplish on-boarding of the extender with a gateway apparatus by operation of a single push button on the gateway apparatus, or through the single operation of an on-boarding command initiated by the user on a mobile device, such as a smart phone. Please note that reference herein to onboarding applies to extenders and pairing applies to client devices such as mobile phones.

A first aspect is a wireless network system comprising:
an electronic apparatus including a memory having stored therein a first onboarding program, a controller comprising a processor that executes the first onboarding program to, in response to an onboarding command signal, initiate an extender onboarding process and wirelessly transmit an onboarding SSID; and an extender apparatus for establishing a backhaul wireless communication link with the electronic apparatus, said extender apparatus including: a wireless communication circuit, a memory having stored therein a second onboarding program, and a controller comprising a processor that executes the second onboarding program to:
  scan signals detected by the wireless communication circuit for presence of the onboarding SSID transmitted by the electronic apparatus;
  in response to detection of the onboarding SSID, establish an onboarding wireless communication link with the electronic apparatus based on the onboarding SSID;
  transmit a backhaul information request to the electronic apparatus via the onboarding wireless communication link;
  receive backhaul credentials, including a backhaul SSID, from the electronic apparatus via the onboarding wireless communication link;
  after receiving the backhaul credentials, disassociate the extender apparatus from the onboarding SSID, associate the extender apparatus with the backhaul SSID, and establish a wireless backhaul link with the electronic apparatus based on the backhaul SSID, wherein the wireless backhaul link is different from the onboarding wireless communication link, and wherein use of the wireless backhaul link requires the backhaul SSID; and
  after establishing the wireless backhaul link, end the extender onboarding process, and wirelessly communicate with the electronic apparatus via the wireless backhaul link.

According to a second aspect, the processor of the electronic apparatus further executes the first onboarding program to, in response to receiving the backhaul information request, generate a challenge including a nonce, and transmit the challenge via the onboarding wireless communication link;

the processor of the extender apparatus further executes the second onboarding program to receive the challenge, including the nonce, from the electronic apparatus via the onboarding wireless communication link, execute a process of digitally signing the nonce with a public key of the extender device certificate, which is stored in memory, generate a challenge response, which includes the certificate and the signed nonce, and transmit the challenge response to the electronic apparatus via the onboarding wireless communication link; and the processor of the electronic apparatus further executes the first onboarding program to receive the challenge response, determine whether the challenge response is correct, and if correct, send the backhaul credentials, including the backhaul SSID, via the onboarding wireless communication link.

According to a third aspect, the electronic apparatus includes a button, the onboarding command signal results from a push of the button, and in response to the onboarding command signal, the processor of the electronic apparatus executes the first onboarding program to initiate both the extender onboarding process and a device pairing process.

According to a fourth aspect, the processor of the electronic apparatus further executes the first onboarding program to determine extender onboarding process failure when the backhaul wireless link is not established within a predetermined period of time, to determine pairing process failure when the pairing process is not completed within a the predetermined period of time, and to end both the onboarding process and the pairing process when either extender onboarding process failure or pairing process failure is determined.

According to a fifth aspect, the processor of the electronic apparatus further executes the first onboarding program to determine extender onboarding process success when the backhaul wireless link is established, to determine pairing process success when the pairing process is completed, and to end both the onboarding process and the pairing process when either extender onboarding process success or pairing process success is determined.

According to a sixth aspect, the processor of the electronic apparatus further executes the first onboarding program to determine process failure when the backhaul wireless link is not established within a predetermined period of time, and to end the onboarding process when process failure is determined.

According to a seventh aspect, the onboarding command signal results from receipt of a signal from the mobile electronic device; and the electronic apparatus transmits a signal to the mobile electronic device indicating success or failure of the onboarding process.

According to an eighth aspect, the system includes a gateway apparatus, wherein the electronic apparatus is a second extender, which was previously onboarded to the gateway apparatus.

According to the ninth aspect, the gateway apparatus includes a memory having stored therein a third onboarding program, a controller comprising a processor that executes the third onboarding program;

the second extender relays information from the extender apparatus to the gateway apparatus;

the processor of the gateway apparatus executes the third onboarding program to, in response to receiving the backhaul information request, generate a challenge including a nonce, and transmit the challenge via the onboarding wireless communication link;

the processor of the extender apparatus further executes the second onboarding program to receive the challenge, including the nonce, from the gateway apparatus via the onboarding wireless communication link, execute a process of digitally signing the nonce with a public key of the extender device certificate, which is stored in memory, generate a challenge response, which includes the certificate and the signed nonce, and transmit the challenge response to the gateway apparatus via the onboarding wireless communication link; and the processor of the gateway apparatus further executes the third onboarding program to receive the challenge response, determine whether the challenge response is correct, and if correct, send the backhaul credentials, including the backhaul SSID, via the onboarding wireless communication link.

According to a tenth aspect, two or more of the first, second, and third onboarding programs are identical software programs.

An eleventh aspect is a non-transitory computer readable medium having stored thereon a program for establishing a backhaul wireless connection between an electronic apparatus and an extender apparatus, the program being executed by processors on the electronic apparatus and the extender apparatus, respectively, to perform at least:

executing with a processor in the electronic apparatus a first onboarding program to, in response to an onboarding command signal, initiate an extender onboarding process and wirelessly transmit an onboarding SSID; and executing with a processor in the extender apparatus a second onboarding program to:
  scan signals detected by the wireless communication circuit for presence of the onboarding SSID transmitted by the electronic apparatus;
  in response to detection of the onboarding SSID, establish an onboarding wireless communication link with the electronic apparatus based on the onboarding SSID;
  transmit a backhaul information request to the electronic apparatus via the onboarding wireless communication link;
  receive backhaul credentials, including a backhaul SSID, from the electronic apparatus via the onboarding wireless communication link;
  after receiving the backhaul credentials, disassociate the extender apparatus from the onboarding SSID, associate the extender apparatus with the backhaul SSID, and establish a wireless backhaul link with the electronic apparatus based on the backhaul SSID, wherein the wireless backhaul link is different from the onboarding wireless communication link, and wherein use of the wireless backhaul link requires the backhaul SSID; and
  after establishing the wireless backhaul link, end the extender onboarding process, and wirelessly communicate with the electronic apparatus via the wireless backhaul link.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples and not for the purpose of limiting the present disclosure as defined by the appended claims and their equivalents. Those of ordinary skill in the art will recognize that various changes and modifications of the examples described herein can be made without departing from the spirit and scope of the present disclosure. In addition, descriptions of well-known functions and constructions may be omitted for clarity and conciseness.

Figure 1:
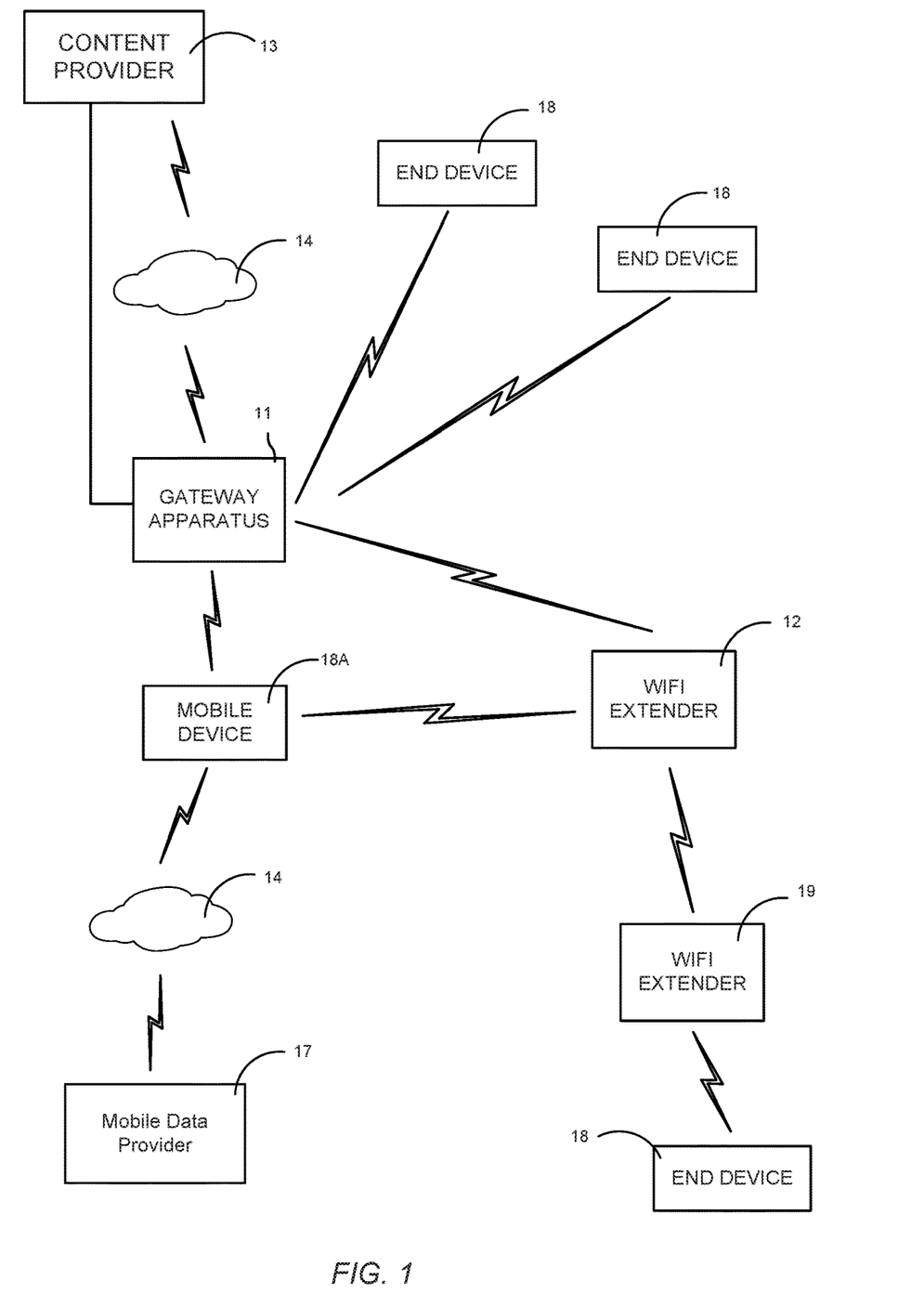
FIG. 1 is a diagram of a network including a gateway apparatus and an extender apparatus.

As illustrated in FIG. 1, a gateway apparatus 11, also referred to as a gateway, residential gateway, or RG, is connected with a content provider 13 either through wiring such as a coaxial network or fiber network, or through a wireless network 14, such as 5G, etc. The gateway apparatus 11 establishes, or is part of, a wireless local area network (WLAN), using Wi-Fi for example, such that end devices are able to communicate wirelessly with the gateway apparatus 11. The RG serves as a gateway to the internet for one or more electronic devices, e.g., end devices 18, that wirelessly communicate with the gateway via, e.g., Wi-Fi. One or more Wi-Fi extenders 12 can be paired with the gateway apparatus in order to communicate wirelessly with the gateway apparatus and extend the coverage area of the WLAN. A mobile device 18A, which is one example of an end device 18, can be in communication with the gateway apparatus 11 or a Wi-Fi extender 12. The mobile device 15 can also have a wireless data communication via the wireless network 14 e.g., 3G, 4G, 5G, etc., with a mobile data provider 17. Other examples of end devices are appliances, or any other so called internet of things equipped devices that are equipped to communicate information via the WLAN.

In general terms, consider that the gateway 11 has the capability of wirelessly communicating with plural electronic user devices over respective communication avenues. In order to extend the area in which the WLAN is effective, beyond the radio reach of the RG, an extender 12 can be added. The establishment of the operative communications between the extender and the gateway (or between a new extender and an already established extender) is referred to as onboarding the extender. The extender can communicate wirelessly with the RG. But rather than using one of the communication avenues that are allocated for communication with user devices, a dedicated avenue of communication is established between the extender and the RG. This dedicated avenue is referred to as a backhaul, and is an avenue of communication that is by design not to be discoverable or usable by user devices. The backhaul avenue of communication is essentially invisible to electronic devices during the pairing process. This invisibility is practical insofar as it reserves the backhaul channel for use in communication between the extender and gateway apparatus rather than making the avenue available for normal pairing between electronic devices and the gateway apparatus. However, the invisibility of the backhaul avenue, or channel, serves a security function as well, by not allowing neighboring devices to accidentally or maliciously access the WLAN of which the gateway apparatus is a part. As can be understood, the on-boarding of the extender includes establishing the backhaul connection between the gateway apparatus and the extender.

Within the WLAN, electronic devices are often referred to as being stations in the network. In IEEE 802.11 (Wi-Fi) terminology, a station (abbreviated as STA) is a device that has the capability to use the 802.11 protocol. For example, a station may be a laptop, a desktop PC, PDA, access point or Wi-Fi phone. An STA may be fixed, mobile or portable. Generally in wireless networking terminology, a station, wireless client, and node are often used interchangeably, with no strict distinction existing between these terms. A station may also be referred to as a transmitter or receiver based on its transmission characteristics. IEEE 802.11-2012 defines station as: A logical entity that is a singly addressable instance of a medium access control (MAC) and physical layer (PHY) interface to the wireless medium (WM).

An electronic device that is a wireless extender requires a STA for its wireless backhaul connection with an upstream electronic device (e.g. residential gateway or another wireless extender). We refer to the STA used for such a backhaul connection as a backhaul STA (bSTA) throughout the remainder of this application.

A service set ID (SSID) is an identification (in IEEE 802.11) that is broadcast by access points in beacon packets to announce the presence of a network access point for the SSID. SSIDs are customizable IDs that can be zero to 32 bytes, and can be in a natural language, such as English.

Figure 2:
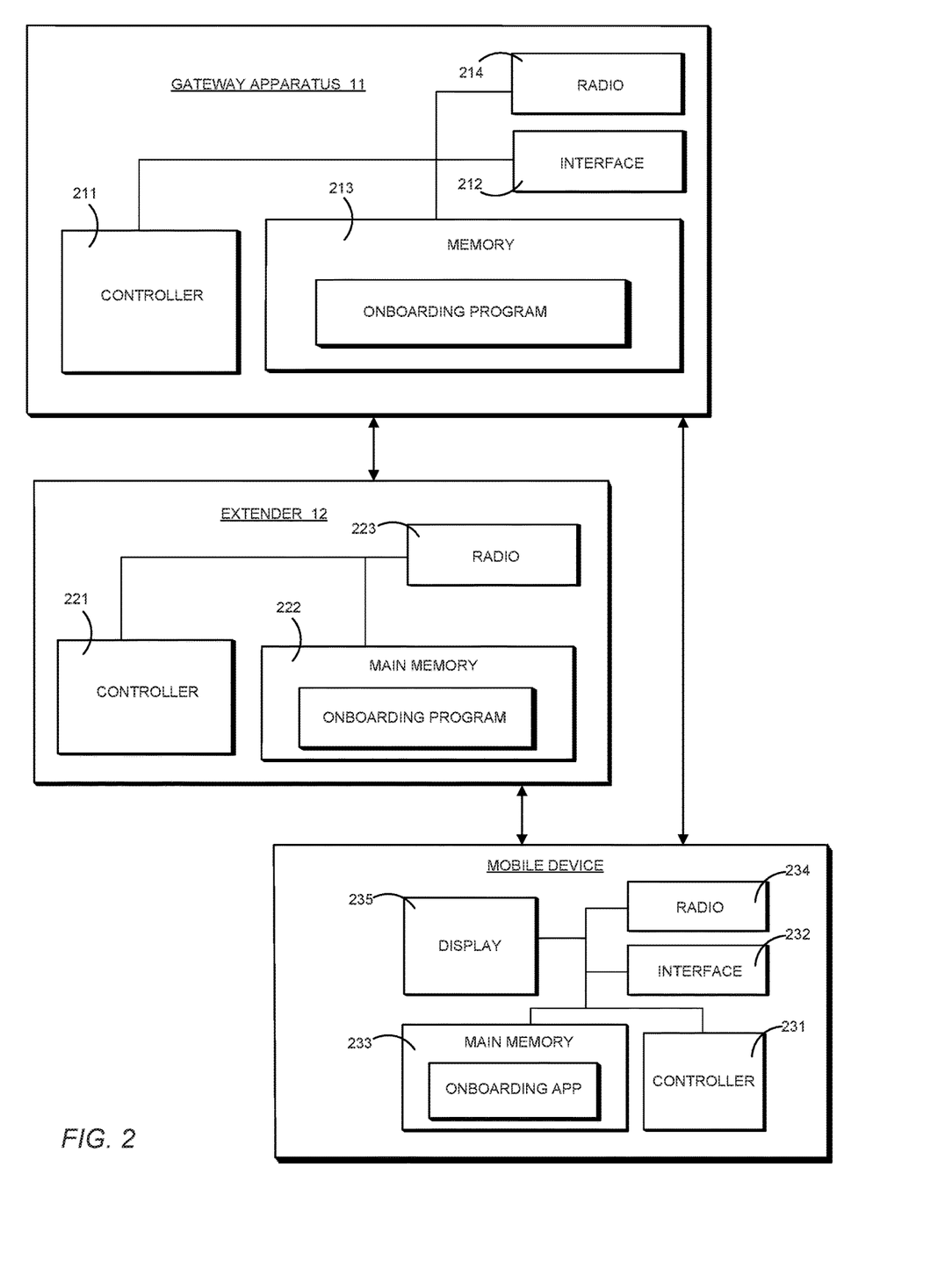
FIG. 2 is a diagram of a gateway apparatus, extender apparatus, and mobile device.

As shown in FIG. 2, gateway apparatus 11 includes a controller 211, which can include a dedicated control circuit, CPU, microprocessor, etc. The controller 211 controls the circuits of the gateway apparatus 11. Memory 213 can store various programming, and user content, and includes onboarding software.

The gateway apparatus 11 includes an interface circuit 212, which can include one or more connectors, such as RF connectors, or Ethernet connectors, and/or wireless communication circuitry, such as 5G circuitry and antenna. The interface circuit 212 receives content from the content provider 13, such as a multiple system operator (MSO), by terrestrial antenna, satellite dish, wired cable, or 5G. Through the interface circuit 212, the gateway apparatus receives an input signal, including data and/or audio/video content, from the content provider and can send data to the provider.

The gateway apparatus 11 includes a radio 214, also referred to as a wireless communication circuit, such as a Wi-Fi WLAN interface radio transceiver for communication with the end devices 18, 18A, and the extenders 12. The radio 214 includes an antenna and communicates wirelessly via 2.4 GHz band with a bandwidth of 22 MHz and a data rate up to 150 Mbit/s. The gateway apparatus 11 can also be equipped with a second radio, such as a Bluetooth interface radio transceiver and antenna, which communicates wirelessly in the ISM band, from 2.400 to 2.485 GHz. As an alternative, at least one of the first and second radios can be a radio meeting a Radio Frequency For Consumer Electronics (RF4CE) protocol, zigbee protocol, and/or IEEE802.15.4 protocol, which also communicates in the ISM band.

The extender 12 includes a controller 221, which can include a dedicated control circuit, CPU, microprocessor, etc. The controller 221 controls the circuits of the extender 12. Memory 223 can store various programming, and user content, and includes onboarding software.

The extender 12 includes a radio 223, also referred to as a wireless communication circuit, such as a Wi-Fi WLAN interface radio transceiver for communication with the end devices 18, 18A, and the gateway apparatus 11. The radio 223 includes an antenna and communicates wirelessly via 2.4 GHz band with a bandwidth of 22 MHz and a data rate up to 150 Mbit/s. The extender 12 can also be equipped with a second radio, such as a Bluetooth interface radio transceiver and antenna, which communicates wirelessly in the ISM band, from 2.400 to 2.485 GHz. As an alternative, at least one of the first and second radios can be a radio meeting a Radio Frequency For Consumer Electronics (RF4CE) protocol, zigbee protocol, and/or IEEE802.15.4 protocol, which also communicates in the ISM band.

The gateway apparatus includes an onboarding program in its memory 213. In execution of the onboarding program, the controller 211 (e.g., via a processor) of the gateway apparatus 11 transmits an On-Board SSID. Likewise, the extender 12 includes an onboarding program in its memory 222. In execution of the onboarding program, the controller 221 (e.g., via a processor) executes the onboarding program to detect the On-Board SSID and initiates association on this On-Board SSID to get information for a backhaul SSID (BH-SSID) on-boarding. The extender 12 also has stored in its memory 222 a predetermined On-Board SSID and key information credentials that are known by the gateway apparatus 11. The extender 12 also has stored in its memory 222 a public device certificate that shares a common certification authority that cryptographically chains to a root certificate stored in the memory 213 of the gateway apparatus 11.

Figure 3:
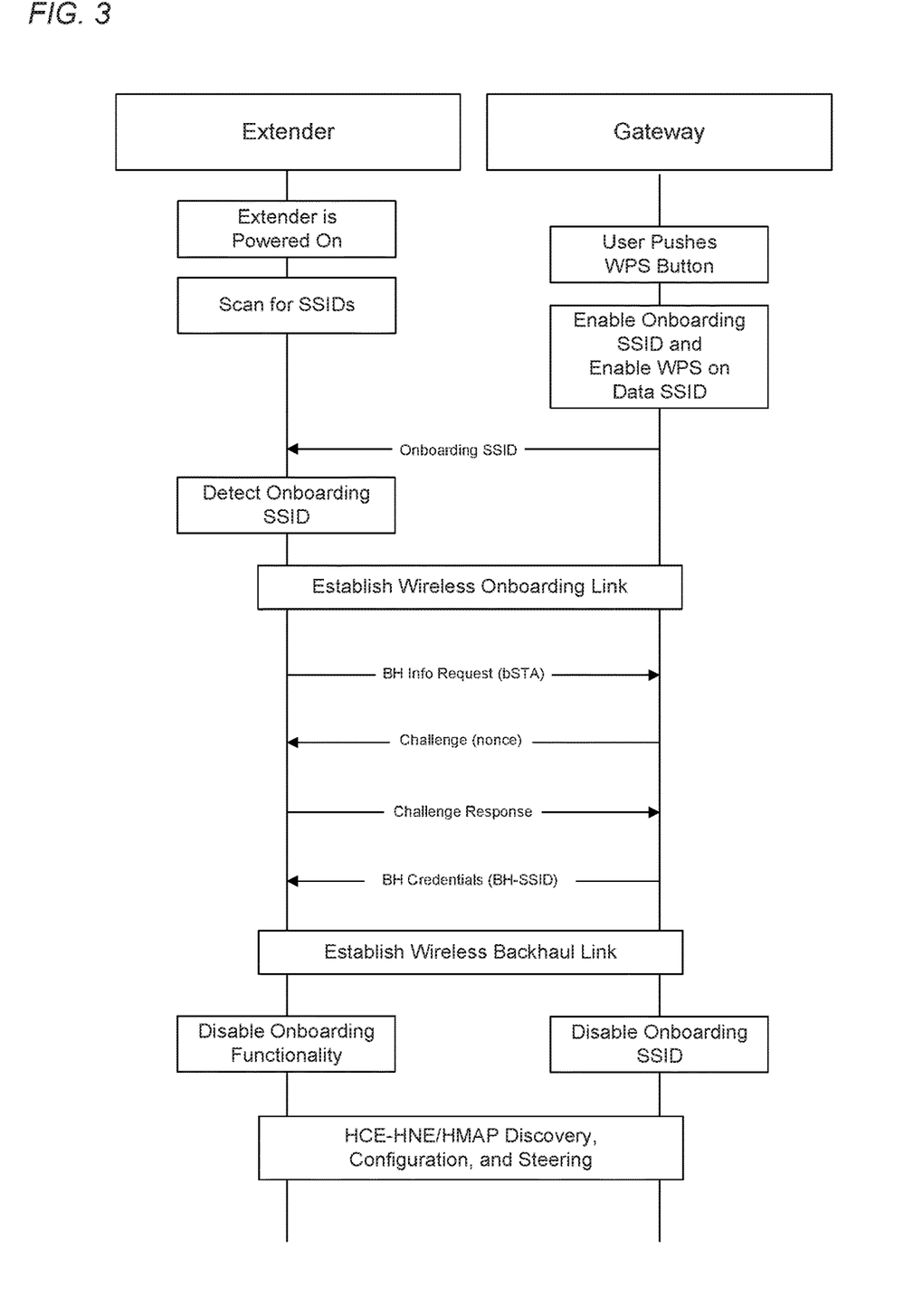
FIG. 3 is a timing diagram of operations of a gateway apparatus and an extender apparatus in which onboarding is initiated by a push button on the gateway apparatus.

Operations of the gateway apparatus 11 and an extender 12 to be added are shown in the timing diagram of FIG. 3 which illustrates an onboarding processes that is initiated by a push button on the gateway apparatus. The onboarding of the extender 12 to the gateway apparatus 11 involves establishing a backhaul communication channel between the two devices. The user starts the onboarding of a new extender 12 by powering on the extender 12, and then pushing the WPS button on their gateway apparatus 11. In response to the pushing of the WPS button, the controller 211 of the gateway apparatus 11 executes both the extender onboarding process and a more conventional pairing process, e.g. Wi-Fi Alliance (WFA) WPS (aka Wi-Fi Simple Configuration) operations on its assigned SSID (e.g. data SSID). This dual execution of the extender onboarding and conventional pairing provides a simple intuitive operation for a user who is adding an extender because it is the same operation, i.e., pushing the WPS button, that is performed by the user when pairing any device (e.g., end device 18) with the gateway apparatus 11, but is easier in only requiring the pushing of one button (e.g., one button on the gateway apparatus, with no need to also push a button on the extender 12 which is likely remotely located a distance away from the gateway apparatus 11). Completion or failure of either process (onboarding or conventional pairing) ends both processes.

After the extender 12 is powered, the controller 221 of the extender 12, operating as a backhaul STA (bSTA), scans, via Wi-Fi, for the presence of the On-Board SSID. Likewise, after initiation of the extender on-boarding process by the gateway apparatus 11, the controller 211 of the gateway apparatus 11 transmits the On-Board SSID via Wi-Fi. Once the extender's bSTA detects the On-Board SSID, the controller 221 of the extender 12 and the controller 211 of the gateway apparatus 11 use the On-Board SSID to establish and communicate via a wireless onboarding link. Then the controller 221 of the extender 12 sends, via Wi-Fi, a backhaul (BH) information request to the gateway apparatus 11. The gateway apparatus 11 responds to the backhaul information request by generating a nonce (e.g., a random number), and transmits via Wi-Fi a challenge that contains the nonce. In response to receiving the challenge, the controller 221 of the extender 12 executes a process of digitally signing the nonce that has been sent by the gateway apparatus 11 with the public key of extender's device certificate, which is stored in memory 222 of the extender 12, to generate a challenge response, which includes the device certificate and the signed nonce, and transmits the challenge response. Once the gateway apparatus 11 receives the challenge response, the controller 211 of the gateway apparatus 11 executes a process of validating the challenge response for accuracy and, if successfully validated, transmits backhaul credentials (BH credentials), including a backhaul BH SSID to the extender 12.

After the extender 12 receives the credentials, the controller 221 of the extender 12 disassociates its bSTA from the on-boarding SSID, configures the bSTA according to the received BH credentials, and associates its bSTA with the newly received BH SSID, thereby the extender and gateway apparatus have established a wireless backhaul link. The controller 221 of the extender 12 then disables the onboarding functionality. Upon association of its bSTA with the BH SSID sent by the gateway apparatus 11, the controller 221 of the extender 12 retains the BH credentials in memory 222 for use upon subsequent resetting, rebooting, etc., of the extender 12.

The controller 211 of the gateway apparatus 11 determines whether the extender 12 has successfully associated its bSTA with the BH SSID. When the determination is affirmative, within a predetermined timeout period, that the extender 12 has successfully associated its bSTA with the BH SSID, the controller 211 of the gateway apparatus 11 determines that an extender on-boarding has succeeded and proceeds to disable its on-boarding SSID. Alternatively, when no affirmative determination is made within the predetermined timeout period that the extender 12 has successfully associated its bSTA with the BH SSID, the controller 211 of the gateway apparatus 11 determines that an extender on-boarding has failed and proceeds to disable its on-boarding SSID. A failure can be for any reason including challenge response validation failure.

Since the push button on the gateway apparatus 11 initiates WPS on-boarding operations (e.g. on data SSID) in parallel with extender On-Boarding SSID operations discussed above, a user would alternatively be using the WPS button for WPS operations (e.g. for a STA device onboarding). No changes to WPS operations are intended. If WPS operations detect on-boarding success, it will declare success and terminate its operations. If it does not reach success within given time period, it will declare failure and terminate its operations. The extender On-Boarding SSID operations and WPS on-boarding operations share the same time period (e.g. standard 2 min) and success for either operation will result in termination operations on both. Moreover we assume the gateway apparatus includes an LED, and displays WPS LED success when either operation succeeds and failure when both operations fail.

Subsequent operations of the gateway apparatus 11 and extender 12 may depend on whether they are operating a proprietary mesh network solution such as CommScope HNC/HNE or a standard Easy Mesh MAP solution (modes of operation). However, at the functional level, both HNC/HNE and MAP end up further configuring the extender and conducting steering operations for its wireless clients.

As explained above, operation by a user of the single WPS push button on the gateway apparatus 11 initiates both the extender backhaul On-Boarding SSID operations and regular WPS on-boarding operations to simplify user operations. An alternative approach is to over-load the WPS push button by having the user hold it for a short time (under a preset time period) for initiation of the WPS operation, and hold it for a longer time (over a preset time period) for initiation of extender backhaul On-Boarding SSID operations.

The extender may provide the gateway apparatus with the MAC address of its bSTA in its BH info request so to help the gateway apparatus confirm when the extender associates with its BH credentials.

For validation of an extender challenge response, the controller 211 of the gateway apparatus 11 executes the following operations:

validate the received public certificate against the gateway apparatus' root certificate that has a private key which was used to sign the extenders device certificate (or to that of an intermediate certificate in chain to the root certificate and device certificate);

if the received public certificate successfully validates, decrypt the signed nonce with the extenders public certificate to get the clear nonce; and compare the decrypted nonce against the nonce the gateway apparatus sent to the extender and, if they match, declare the challenge a success.

The controller 211 of the gateway apparatus 11 is also configured to execute network controller functionality (e.g., for HNC/HNE or MAP). However, the network controller functionality can alternatively be implemented by another extender in the network.

To support easy on-boarding of a wireless extender on a new gateway apparatus that is added to the network to replace a prior gateway apparatus, the controller 221 of the extender 12 resumes scanning for the on-boarding SSID after losing association to its previously acquired/associated BH SSID (e.g. because of gateway apparatus replacement). Also, to support easy on-boarding of a wireless extender that is moved under a different gateway apparatus (e.g., in a different home), the controller 221 of the extender 12 resumes scanning for the on-boarding SSID after not being able to associate with its previously acquired/associated BH SSID (e.g. because the extender 12 is moved to a different location having a different gateway apparatus).

By nature, bSTA can only be assigned one set of SSID credentials, which are the credentials to be scanned for and acquired in the on-boarding procedure. In order to accomplish this, the memory 222 of the extender 12 includes additional extender application-layer logic by execution of which the controller 221 monitors the status of the previously acquired/associated BH SSID state, on-going and after boot, and, after loss of an association or lack of association, the controller 221 reconfigures its bSTA for the On-Boarding BSS again.

While, as described above and shown in FIG. 3, the wireless extender 12 is on-boarded directly on the BH SSID of the gateway apparatus 11. However, the procedure disclosed above is more generally applicable to include functionality enabling the wireless extender 12 to be on-boarded onto either the gateway apparatus 11 or onto an already onboarded extender. As shown for example in FIG. 1, the wireless extender 19 is illustrative of an extender that is onboarded onto an existing extender 12.

Figure 5:
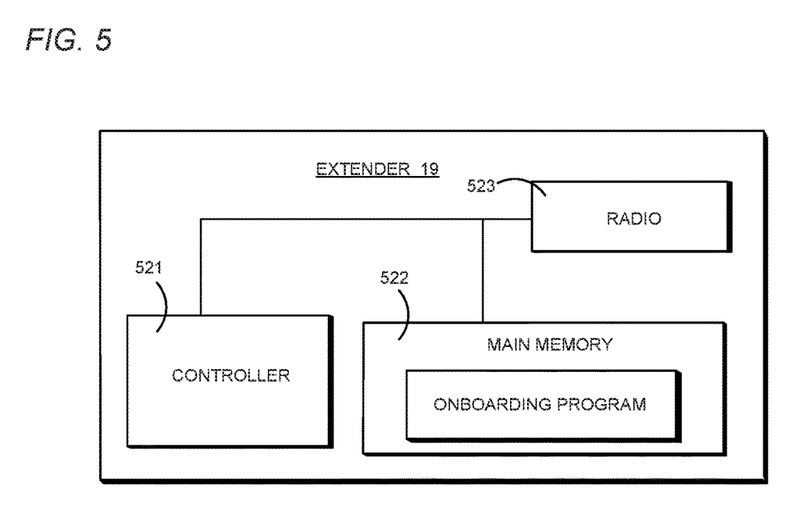
FIG. 5 is a diagram of an extender apparatus.

As shown in FIG. 5, the extender 19 can be the same as extender 12, and includes a controller 521, which can include a dedicated control circuit, CPU, microprocessor, etc. The controller 521 controls the circuits of the extender 19. Memory 523 can store various programming, and user content, and includes onboarding software. The extender 19 includes a radio 523, also referred to as a wireless communication circuit, such as a Wi-Fi WLAN interface radio transceiver for communication with the end devices 18, 18A, the gateway apparatus 11, and other extenders 12. The radio 523 includes an antenna and communicates wirelessly via 2.4 GHz band with a bandwidth of 22 MHz and a data rate up to 150 Mbit/s. The extender 19 can also be equipped with a second radio, such as a Bluetooth interface radio transceiver and antenna, which communicates wirelessly in the ISM band, from 2.400 to 2.485 GHz. As an alternative, at least one of the first and second radios can be a radio meeting a Radio Frequency For Consumer Electronics (RF4CE) protocol, zigbee protocol, and/or IEEE802.15.4 protocol, which also communicates in the ISM band.

Figure 4:
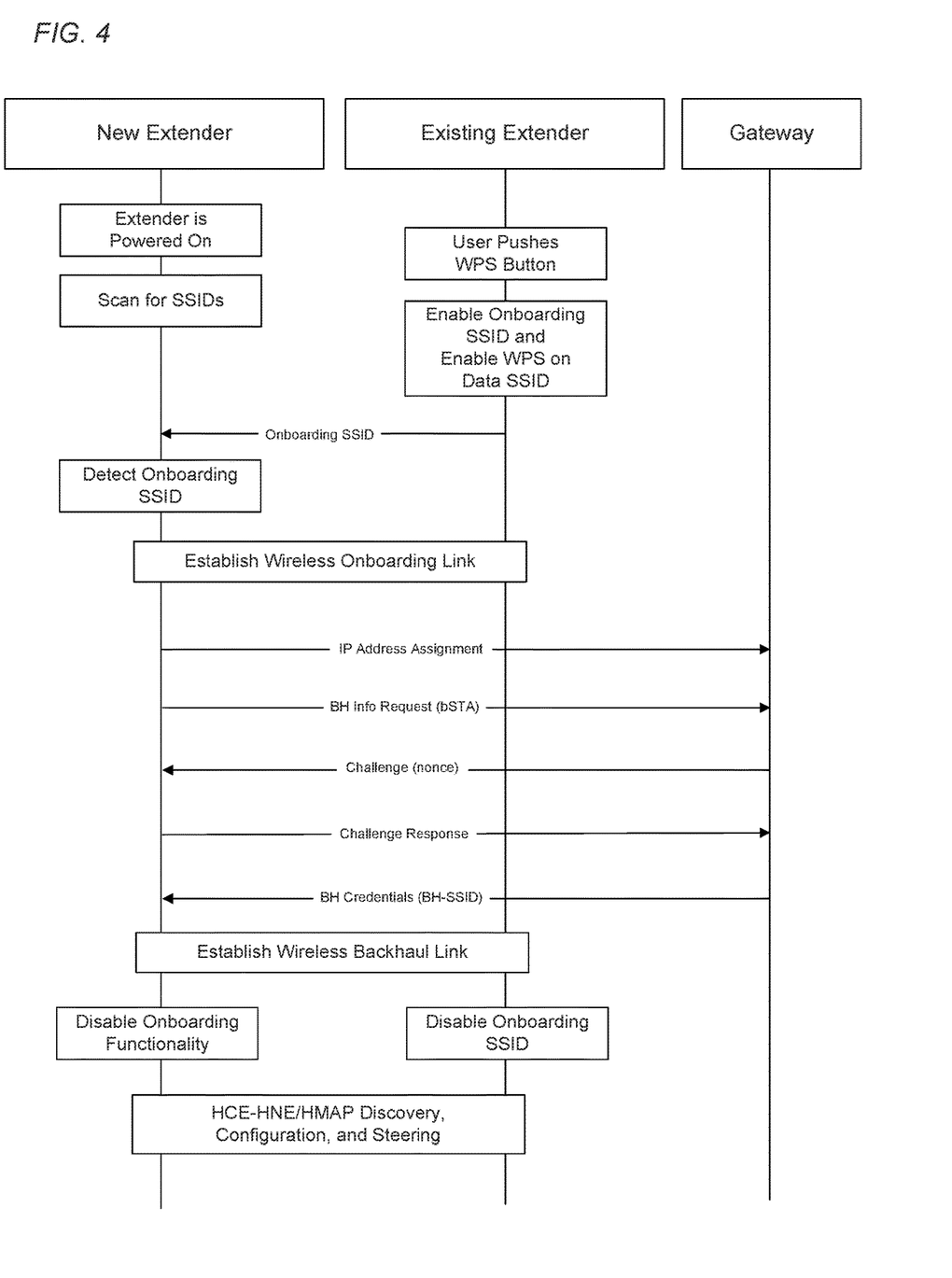
FIG. 4 is a timing diagram of operations of a gateway apparatus, a new extender apparatus, and an existing extender apparatus for onboarding the new extender using a push button, in a system that already includes an existing, previously on-boarded, extender.

Compared to the procedure shown in the timing diagram of FIG. 3, the procedure for onboarding an extender 19 onto an existing extender 12 as shown in FIG. 4, the extender (12) includes a WPS button, and in memory 222, programming that causes the controller 221, when it is an existing extender 12, to perform operations in response to a push of the WPS button. The user pushes the WPS push button on the device (gateway apparatus, or already on-boarded extender) that is closest to the new extender and which is therefore the device onto which the new extender is to be onboarded. In the example shown in FIG. 4, the gateway apparatus 11 still handles the logic for all BH info request, challenge, and response communication with a new extender (just via existing extender(s) per network communication needs). Note that all communications between the gateway apparatus 11 and the new extender 19 are via in part the backhaul between the gateway apparatus 11 and the existing extender 12.

Specific operations of the gateway apparatus 11 and an extender 19 to be added, and existing extender 12 are shown in the timing diagram of FIG. 4. The onboarding of the extender 19 to the existing extender 12 involves establishing a backhaul communication channel between the extender 19 and the existing extender 12. The user starts the onboarding of a new extender 19 by powering on the extender 19, and then pushing the WPS button on existing extender 12. In response to the pushing of the WPS button, the controller 221 of the existing extender 12 executes both the extender onboarding process and a more conventional pairing process, e.g. Wi-Fi Alliance (WFA) WPS (aka Wi-Fi Simple Configuration) operations on its assigned SSID (e.g. data SSID). This dual execution of the extender onboarding and conventional pairing provides a simple intuitive operation for a user who is adding an extender because it is the same operation, i.e., pushing the WPS button, that is performed by the user when pairing any device (e.g., end device 18) with the existing extender 12, but is easier in only requiring the pushing of one button (e.g., one button on the existing extender 12, with no need to also push a button on the new extender 19 which is likely remotely located a distance away from the existing extender 12). Completion or failure of either process (onboarding or conventional pairing) ends both processes.

After the extender 19 is powered, the controller 521 of the extender 19, operating as a backhaul STA (bSTA), scans, via Wi-Fi, for the presence of the On-Board SSID. Likewise, after initiation of the extender on-boarding process by the existing extender 12, the controller 221 of the existing extender 12 transmits the On-Board SSID via Wi-Fi. Once the bSTA of the new extender 19 detects the On-Board SSID, the controller 521 of the extender 19 and the controller 221 of the existing extender 12 use the On-Board SSID to establish and communicate via a wireless onboarding link. Then the controller 521 of the extender 19 sends, via Wi-Fi, (and via the backhaul between the existing extender 12 and the gateway apparatus 11) a backhaul (BH) information request (as well as its IP address assignment) to the gateway apparatus 11. The gateway apparatus 11 responds to the backhaul information request by generating a nonce (e.g., a random number), and transmits (via the backhaul to the extender 12 and via Wi-Fi to the extender 19) a challenge that contains the nonce. In response to receiving the challenge, the controller 521 of the extender 19 executes a process of digitally signing the nonce that has been sent by the gateway apparatus 11 with the public key of device certificate of extender 19, which is stored in memory 522 of the extender 19, to generate a challenge response, which includes the device certificate and the signed nonce, and transmits the challenge response. Once the gateway apparatus 11 receives the challenge response, the controller 211 of the gateway apparatus 11 executes a process of validating the challenge response for accuracy and, if successfully validated, transmits backhaul credentials (BH credentials), including a backhaul BH SSID to the extender 19.

After the extender 19 receives the credentials, the controller 521 of the extender 19 disassociates its bSTA from the on-boarding SSID, configures the bSTA according to the received BH credentials, and associates its bSTA with the newly received BH SSID, thereby the extender 19 and extender 12 have established a wireless backhaul link. The controller 521 of the extender 19 then disables the onboarding functionality. Upon association of its bSTA with the BH SSID sent by the gateway apparatus 11, the controller 521 of the extender 19 retains the BH credentials in memory 522 for use upon subsequent resetting, rebooting, etc., of the extender 19.

The controller 221 of the existing extender 12 determines whether the extender 19 has successfully associated its bSTA with the BH SSID. When the determination is affirmative, within a predetermined timeout period, that the extender 19 has successfully associated its bSTA with the BH SSID, the controller 221 of the existing extender 12 determines that an extender on-boarding has succeeded and proceeds to disable its on-boarding SSID. Alternatively, when no affirmative determination is made within the predetermined timeout period that the extender 19 has successfully associated its bSTA with the BH SSID, the controller 221 of the existing extender 12 determines that an extender on-boarding has failed and proceeds to disable its on-boarding SSID. A failure can be for any reason including challenge response validation failure.

Since the push button on the existing extender 12 initiates WPS on-boarding operations (e.g. on data SSID) in parallel with extender On-Boarding SSID operations discussed above, a user would alternatively be using the WPS button for WPS operations (e.g. for a STA device onboarding). No changes to WPS operations are intended. If WPS operations detect on-boarding success, it will declare success and terminate its operations. If it does not reach success within given time period, it will declare failure and terminate its operations. The extender On-Boarding SSID operations and WPS on-boarding operations share the same time period (e.g. standard 2 min) and success for either operation will result in termination operations on both. Moreover we assume the gateway apparatus includes an LED, and displays WPS LED success when either operation succeeds and failure when both operations fail.

Subsequent operations of the gateway apparatus 11 and extender 19 may depend on whether they are operating in a proprietary mesh network solution such as CommScope HNC/HNE or a standard Easy Mesh MAP solution (modes of operation). However, at the functional level, both HNC/HNE and MAP end up further configuring the extender and conducting steering operations for its wireless clients.

As explained above, operation by a user of the single WPS push button on the existing extender 12 initiates both the extender backhaul On-Boarding SSID operations and regular WPS on-boarding operations to simplify user operations. An alternative approach is to over-load the WPS push button by having the user hold it for a short time (under a preset time period) for initiation of the WPS operation, and hold it for a longer time (over a preset time period) for initiation of extender backhaul On-Boarding SSID operations.

The extender 19 may provide the gateway apparatus with the MAC address of its bSTA in its BH info request so to help the gateway apparatus confirm when the extender associates with its BH credentials.

To support easy on-boarding of a wireless extender 19 on a new gateway apparatus 11 or new extender 12 that is added to the network to replace a prior device, the controller 521 of the extender 19 resumes scanning for the on-boarding SSID after losing association to its previously acquired/associated BH SSID (e.g. because of gateway apparatus 11 or extender 12 replacement). Also, to support easy on-boarding of a wireless extender 19 that is moved under a different extender (e.g., in a different home or a different location in the same home), the controller 521 of the extender 19 resumes scanning for the on-boarding SSID after not being able to associate with its previously acquired/associated BH SSID (e.g. because the extender 19 is moved to a different location having a different gateway apparatus or existing extender).

By nature, bSTA can only be assigned one set of SSID credentials, which are the credentials to be scanned for and acquired in the on-boarding procedure. In order to accomplish this, the memory 522 of the extender 19 includes additional extender application-layer logic by execution of which the controller 521 monitors the status of the previously acquired/associated BH SSID state, on-going and after boot, and, after loss of an association or lack of association, the controller 521 reconfigures its bSTA for the On-Boarding BSS again.

The above embodiments provide a simple user experience by only requiring one WPS push button operation for the on-boarding. There are no app operations, dual WPS push button needs, or other operations needed for wireless extender on-boarding.

The on-boarding SSID credentials provide one level of security, however the use of device certificate in the BH provisioning exchange on the on-boarding SSID provide a high level of device-specific security. In addition, the activation of the on-boarding SSID operations only when activated by the user (e.g., via push button or an app on a mobile device) and disabling after success or failure within timeout period provide further security, including minimization of accidental on-boarding on a neighbor's RG should they have a similarly equipped RG as well.

The approach is suited for proprietary (e.g., HNC/HNE) and Easy Mesh/MAP deployments. Note however that MAP deployments are also contemplated for use with WiFi Alliance (WFA) Device Provisioning Protocol (DPP) in a version of the MAP specification. The solution can easily be generalized to allow on-boarding on RG or already on-boarded network extenders.

Figure 6:
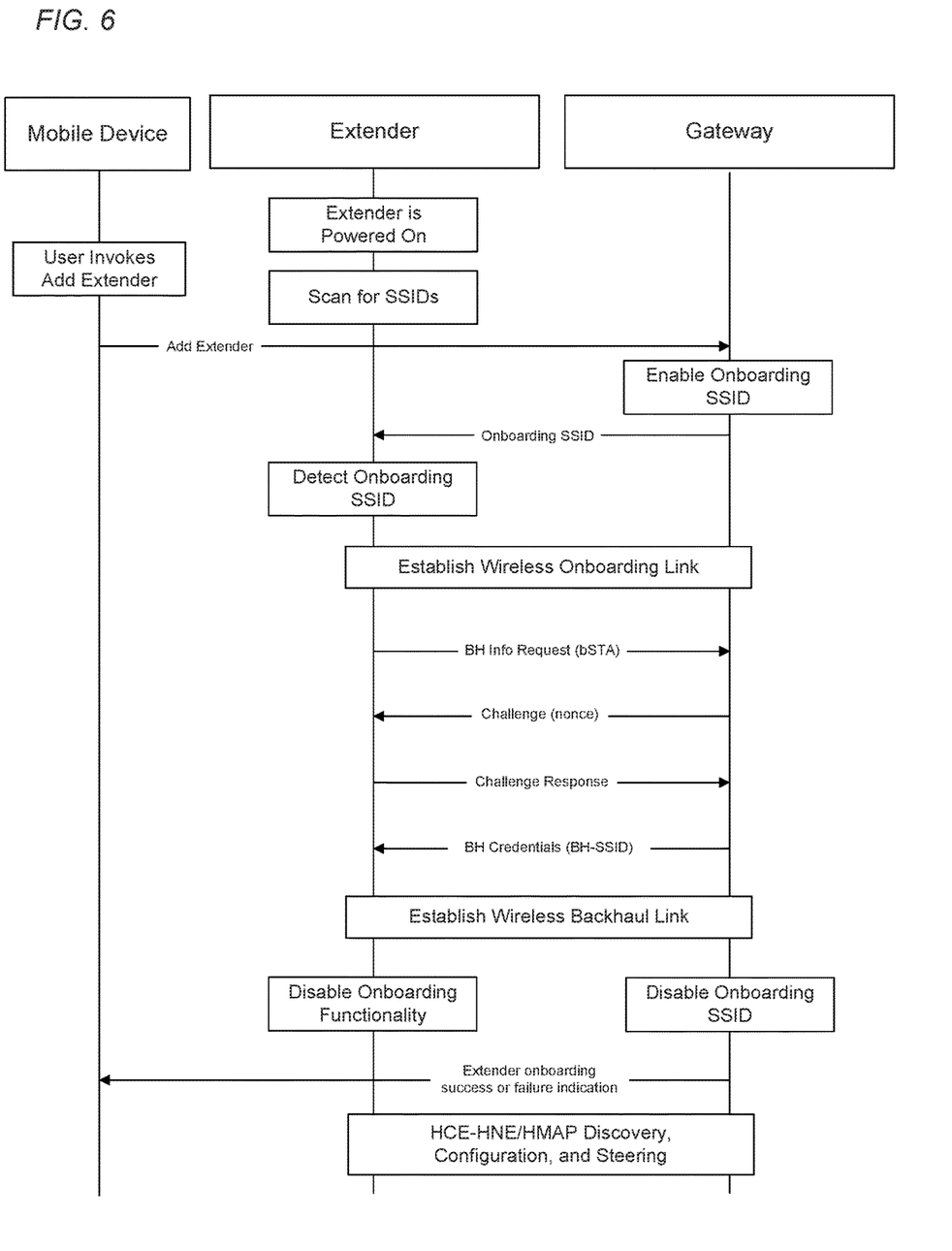
FIG. 6 is a timing diagram of operations of a gateway apparatus, an extender apparatus, and a mobile device in which onboarding is initiated by operation of an application on the mobile device.

In the embodiment shown in FIG. 6, rather than initiation of the onboarding of an extender via pushing of a WPS button on the gateway apparatus 11 (or existing extender 12 as shown in FIG. 5), the onboarding of an extender is initiated via operation of an application (mobile app) running on a mobile device (e.g., mobile device 18A shown in FIG. 1). Prior to onboarding of a new wireless extender, the mobile device 18A must be securely connected (e.g., wirelessly) to gateway apparatus 11 (or to an existing extender), e.g. on front-haul (FH) SSID (e.g. Data SSID) with password (PW) protection. The user must also have downloaded and activated the mobile app needed for wireless extender onboarding. As shown in FIG. 2, the mobile app software is stored on memory 233 of the mobile device 18A. Furthermore, as with the above embodiments, the extender to be added must have an onboarding application for detecting the On-Board SSID and initiating proprietary (e.g., HNC/HNE) or Easy Mesh/MAP association on this SSID to get information for BH-SSID on-boarding. Also as applicable to the above embodiments, the extender must be factory provisioned with a common On-Board SSID and key information (credentials) that are known by the gateway apparatus. The extender must also be factory provisioned with a public device certificate that shares a common certification authority that cryptographically, chains to a root certificate in the gateway apparatus.

Figure 7:
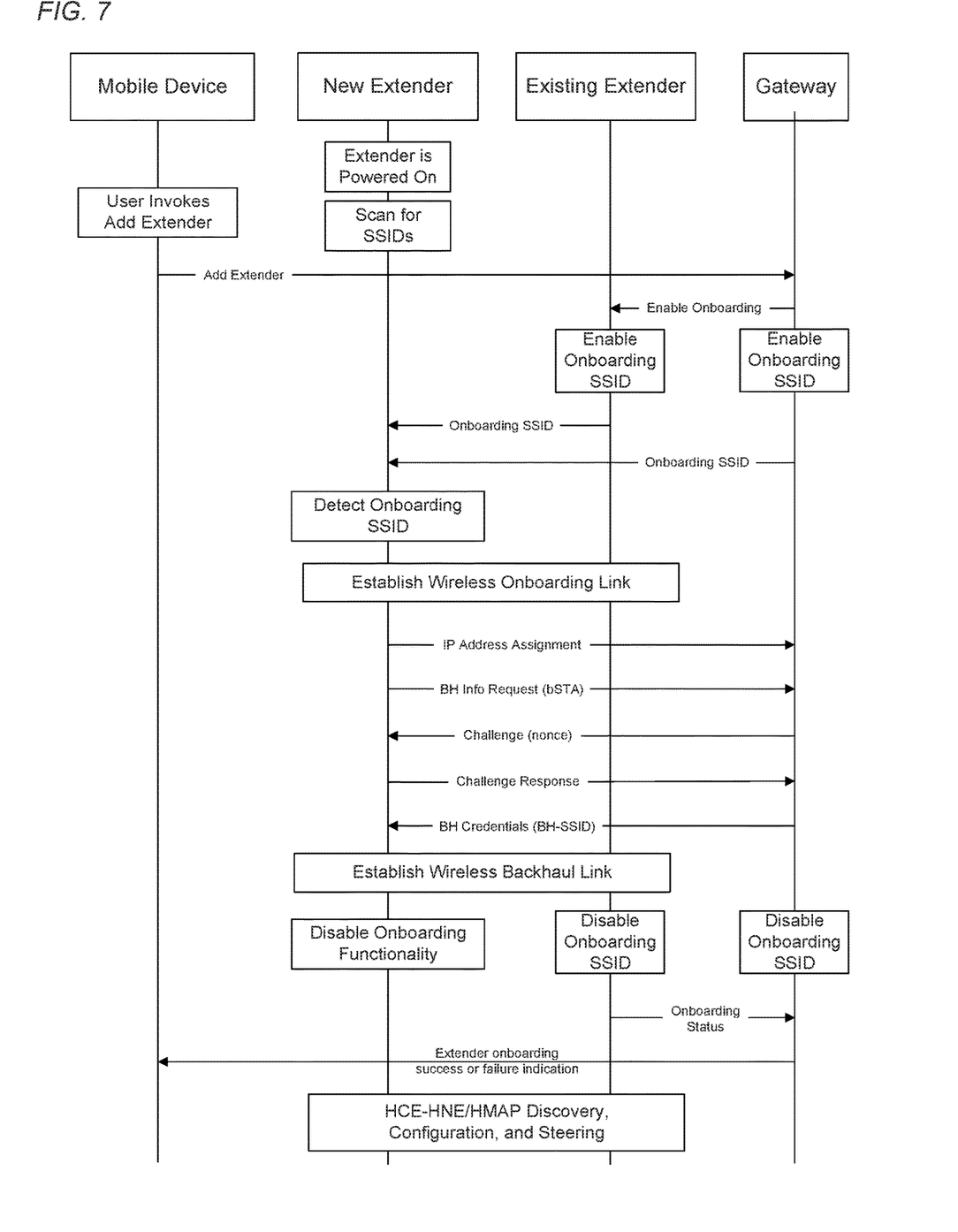
FIG. 7 is a timing diagram of operations of a gateway apparatus, a new extender apparatus, an existing extender apparatus, and a mobile device in which onboarding is initiated by operation of an application on the mobile device, in a system that already includes an existing, previously on-boarded, extender.

As shown in FIGS. 6 and 7, the onboarding process of a new extender proceeds like the process shown in FIG. 3 or 4 and described above. The Add Extender Service selection signals to the gateway apparatus (and/or an existing extender) that the extender onboarding process is to be initiated. Since the mobile app initiation does not rely on the dual use of the WPS button, upon receiving the request from mobile device to initiate the on-boarding process, the controller of the gateway apparatus or existing extender executes the extender onboarding process but does not initiate the more conventional pairing process as in FIG. 3 or 4. Further, rather than (or in addition to) displaying WPS LED success when either operation succeeds and failure when both operations fail as in FIG. 3 or 4, because of the use of the mobile device 18A, an onboarding success or failure indication, as appropriate, is communicated from the gateway apparatus or existing extender to the mobile device 18A.

Additionally, in the embodiment shown in FIG. 7, the gateway apparatus signals to the existing extender (or existing extenders if there are more than one) to enable the on-boarding SSID on them (in addition to enabling it on the gateway apparatus), and the onboarding SSID is sent by the gateway apparatus and the existing extenders. In scanning for and detecting the onboarding SSID, the controller 521 of the new extender 19 will determine the onboarding SSID which has been received with the strongest RSSI, and continues the onboarding process communication with the device that sent the onboarding SSID with the strongest RSSI, so the best signal connection is utilized. The gateway apparatus will still handle the logic for all mobile device communication and all BH info request, challenge, and response communication with a new extender (just via existing extender(s) per network communication needs). Furthermore, the existing extender sends an onboarding status back to the gateway apparatus upon successful onboarding (or failure) of the new extender.

The above may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described herein.

The processes disclosed above constitute algorithms that can be effected by software, applications (apps, or mobile apps), or computer programs. The software, applications, computer programs can be stored on a non-transitory computer-readable medium for causing a computer, such as the one or more processors, to execute the processes described herein and shown in the drawing figures.

The term non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

What we claim is:

1. A wireless network system comprising:
    an electronic apparatus including a memory having stored therein a first onboarding program, a controller comprising a processor that executes the first onboarding program to, in response to an onboarding command signal, initiate an extender onboarding process; and
    an extender apparatus for establishing a wireless backhaul link with the electronic apparatus, said extender apparatus including: a wireless communication circuit, a memory having stored therein a second onboarding program and preconfigured extender onboarding credentials including an onboarding SSID (service set ID) for establishing an onboarding wireless communication link reserved for onboarding the extender apparatus with the electronic apparatus, and a controller comprising a processor that executes the second onboarding program to:
        scan for signals detected by the wireless communication circuit operating as a station having extender onboarding credentials including the onboarding SSID transmitted by the electronic apparatus during the extender onboarding process that match the preconfigured extender onboarding credentials including the onboarding SSID stored in the memory of the extender apparatus;
        in response to detection of the extender onboarding credentials including the onboarding SSID sent by the electronic apparatus matching the preconfigured extender onboarding credentials including the onboarding SSID stored in the memory of the extender apparatus, establish the onboarding wireless communication link reserved for onboarding the extender apparatus with the electronic apparatus;
        transmit a backhaul information request to the electronic apparatus via the onboarding wireless communication link;
        receive backhaul credentials, including a backhaul SSID, from the electronic apparatus via the onboarding wireless communication link;
        after receiving the backhaul credentials, establish the wireless backhaul link with the electronic apparatus by disassociating the extender apparatus from the onboarding SSID, configuring a backhaul station (bSTA) according to the backhaul credentials including the backhaul SSID, and associating the bSTA of the extender apparatus with the backhaul SSID to establish the wireless backhaul link with the electronic apparatus based on the backhaul SSID, wherein the wireless backhaul link is different from the onboarding wireless communication link, and wherein use of the wireless backhaul link requires the backhaul SSID; and after establishing the wireless backhaul link, end the extender onboarding process, and wirelessly communicate with the electronic apparatus via the wireless backhaul link.

2. The wireless network system according to claim 1, wherein the processor of the electronic apparatus further executes the first onboarding program to, in response to receiving the backhaul information request, generate a challenge including a nonce, and transmit the challenge via the onboarding wireless communication link to the extender apparatus;

the processor of the extender apparatus further executes the second onboarding program to receive the challenge, including the nonce, from the electronic apparatus via the onboarding wireless communication link, execute a process of digitally signing the nonce with a public key of the extender device certificate, which is stored in memory, generate a challenge response, which includes the certificate and the signed nonce, and transmit the challenge response to the electronic apparatus via the onboarding wireless communication link; and the processor of the electronic apparatus further executes the first onboarding program to receive the challenge response, determine whether the challenge response is correct, and if correct, send the backhaul credentials, including the backhaul SSID, via the onboarding wireless communication link.

3. The wireless network system according to claim 1, wherein the electronic apparatus includes a button, the onboarding command signal results from a push of the button, and in response to the onboarding command signal, the processor of the electronic apparatus executes the first onboarding program to initiate both the extender onboarding process and a device pairing process.

4. The wireless network system according to claim 3, wherein the processor of the electronic apparatus further executes the first onboarding program to determine extender onboarding process failure when the wireless backhaul link is not established within a predetermined period of time, to determine pairing process failure when the pairing process is not completed within a the predetermined period of time, and to end both the onboarding process and the pairing process when either extender onboarding process failure or pairing process failure is determined.

5. The wireless network system according to claim 3, wherein the processor of the electronic apparatus further executes the first onboarding program to determine extender onboarding process success when the wireless backhaul link is established, to determine pairing process success when the pairing process is completed, and to end both the onboarding process and the pairing process when either extender onboarding process success or pairing process success is determined.

6. The wireless network system according to claim 1, wherein the processor of the electronic apparatus further executes the first onboarding program to determine process failure when the wireless backhaul link is not established within a predetermined period of time, and to end the onboarding process when process failure is determined.

7. The wireless network system according to claim 1, for use with a mobile electronic device, wherein the onboarding command signal results from receipt of a signal from the mobile electronic device; and the electronic apparatus transmits a signal to the mobile electronic device indicating success or failure of the onboarding process.

8. The wireless network system according to claim 1, further comprising a gateway apparatus, wherein the electronic apparatus is a second extender, which was previously onboarded to the gateway apparatus.

9. The wireless network system according to claim 8, wherein the gateway apparatus includes a memory having stored therein a third onboarding program, a controller comprising a processor that executes the third onboarding program;

the second extender relays information from the extender apparatus to the gateway apparatus;

the processor of the gateway apparatus executes the third onboarding program to, in response to receiving the backhaul information request, generate a challenge including a nonce, and transmit the challenge via the onboarding wireless communication link to the extender apparatus;

the processor of the extender apparatus further executes the second onboarding program to receive the challenge, including the nonce, from the gateway apparatus via the onboarding wireless communication link, execute a process of digitally signing the nonce with a public key of the extender device certificate, which is stored in memory, generate a challenge response, which includes the certificate and the signed nonce, and transmit the challenge response to the gateway apparatus via the onboarding wireless communication link; and the processor of the gateway apparatus further executes the third onboarding program to receive the challenge response, determine whether the challenge response is correct, and if correct, send the backhaul credentials, including the backhaul SSID, via the onboarding wireless communication link.

10. The wireless network system according to claim 9, wherein two or more of the first, second, and third onboarding programs are identical software programs.

11. The wireless network system according to claim 1, wherein the first and second onboarding programs are identical software programs.

12. A method of establishing a backhaul wireless connection between an electronic apparatus and an extender apparatus comprising:

executing with a processor in the electronic apparatus a first onboarding program to, in response to an onboarding command signal, initiate an extender onboarding process; and executing with a processor in the extender apparatus a second onboarding program to:

scan for signals detected by a wireless communication circuit of the extender apparatus operating as a station having extender onboarding credentials including an onboarding SSID transmitted by the electronic apparatus during the extender onboarding process that match preconfigured extender onboarding credentials including the onboarding SSID stored in the memory of the extender apparatus;

in response to detection of the extender onboarding credentials including the onboarding SSID sent by the electronic apparatus matching the preconfigured extender onboarding credentials including the onboarding SSID stored in the memory of the extender apparatus, establish an onboarding wireless communication link reserved for onboarding the extender apparatus with the electronic apparatus;

transmit a backhaul information request to the electronic apparatus via the onboarding wireless communication link;

receive backhaul credentials, including a backhaul SSID, from the electronic apparatus via the onboarding wireless communication link;

after receiving the backhaul credentials, establish a wireless backhaul link with the electronic apparatus by disassociating the extender apparatus from the onboarding SSID, configuring a backhaul station (bSTA) according to the backhaul credentials including the backhaul SSID, and associating the bSTA of the extender apparatus with the backhaul SSID to establish the wireless backhaul link with the electronic apparatus based on the backhaul SSID, wherein the wireless backhaul link is different from the onboarding wireless communication link, and wherein use of the wireless backhaul link requires the backhaul SSID; and after establishing the wireless backhaul link, end the extender onboarding process, and wirelessly communicate with the electronic apparatus via the wireless backhaul link.

13. The method according to claim 12, further comprising:

further executing, with the processor of the electronic apparatus, the first onboarding program to, in response to receiving the backhaul information request, generate a challenge including a nonce, and transmit the challenge via the onboarding wireless communication link to the extender apparatus;

further executing, with the processor of the extender apparatus, the second onboarding program to receive the challenge, including the nonce, from the electronic apparatus via the onboarding wireless communication link, execute a process of digitally signing the nonce with a public key of the extender device certificate, which is stored in memory, generate a challenge response, which includes the certificate and the signed nonce, and transmit the challenge response to the electronic apparatus via the onboarding wireless communication link; and further executing, with the processor of the electronic apparatus, the first onboarding program to receive the challenge response, determine whether the challenge response is correct, and if correct, send the backhaul credentials, including the backhaul SSID, via the onboarding wireless communication link.

14. The method according to claim 12, wherein the onboarding command signal results from a push of a button, said method further comprising, in response to the onboarding command signal, executing, with the processor of the electronic apparatus, the first onboarding program to initiate both the extender onboarding process and a device pairing process.

15. The method according to claim 14, further comprising:

further executing, with the processor of the electronic apparatus, the first onboarding program to determine extender onboarding process failure when the wireless backhaul link is not established within a predetermined period of time, to determine pairing process failure when the pairing process is not completed within a the predetermined period of time, and to end both the onboarding process and the pairing process when either extender onboarding process failure or pairing process failure is determined.

16. The method according to claim 14, further comprising:

further executing, with the processor of the electronic apparatus, the first onboarding program to determine extender onboarding process success when the wireless backhaul link is established, to determine pairing process success when the pairing process is completed, and to end both the onboarding process and the pairing process when either extender onboarding process success or pairing process success is determined.

17. The method according to claim 12, further comprising further executing, with the processor of the electronic apparatus, the first onboarding program to determine process failure when the wireless backhaul link is not established within a predetermined period of time, and to end the onboarding process when process failure is determined.

18. The method according to claim 12, wherein the onboarding command signal results from receipt of a signal from a mobile electronic device, said method further comprising transmitting, with the electronic apparatus, a signal to the mobile electronic device indicating success or failure of the onboarding process.

19. The method according to claim 12, wherein the electronic apparatus is a second extender, which was previously onboarded to a gateway apparatus, and the second extender relays information from the extender apparatus to the gateway apparatus, said method further comprising:

executing, with the gateway apparatus, a third onboarding program to, in response to receiving the backhaul information request, generate a challenge including a nonce, and transmit the challenge via the onboarding wireless communication link to the extender apparatus;

further executing, with the processor of the extender apparatus, the second onboarding program to receive the challenge, including the nonce, from the gateway apparatus via the onboarding wireless communication link, execute a process of digitally signing the nonce with a public key of the extender device certificate, which is stored in memory, generate a challenge response, which includes the certificate and the signed nonce, and transmit the challenge response to the gateway apparatus via the onboarding wireless communication link; and further executing, with the processor of the gateway apparatus, the third onboarding program to receive the challenge response, determine whether the challenge response is correct, and if correct, send the backhaul credentials, including the backhaul SSID, via the onboarding wireless communication link.

20. The wireless network system according to claim 19, wherein two or more of the first, second, and third onboarding programs are identical software programs.

21. The wireless network system according to claim 12, wherein the first and second onboarding programs are identical software programs.

22. A non-transitory computer readable medium having stored thereon a program for establishing a backhaul wireless connection between an electronic apparatus and an extender apparatus, the program being executed by processors on the electronic apparatus and the extender apparatus, respectively, to perform at least:

executing with a processor in the electronic apparatus a first onboarding program to, in response to an onboarding command signal, initiate an extender onboarding process; and executing with a processor in the extender apparatus a second onboarding program to:
  scan for signals detected by a wireless communication circuit of the extender apparatus operating as a station having extender onboarding credentials including an onboarding SSID transmitted by the electronic apparatus during the extender onboarding process that match the preconfigured extender onboarding credentials including the onboarding SSID stored in the memory of the extender apparatus;
  in response to detection of the extender onboarding credentials including the onboarding SSID sent by the electronic apparatus matching the preconfigured extender onboarding credentials including the onboarding SSID stored in the memory of the extender apparatus, establish an onboarding wireless communication link reserved for onboarding the extender apparatus with the electronic apparatus;
  transmit a backhaul information request to the electronic apparatus via the onboarding wireless communication link;
  receive backhaul credentials, including a backhaul SSID, from the electronic apparatus via the onboarding wireless communication link;
  after receiving the backhaul credentials, establish a wireless backhaul link with the electronic apparatus by disassociating the extender apparatus from the onboarding SSID, configuring a backhaul station (bSTA) according to the backhaul credentials including the backhaul SSID, and associating the bSTA of the extender apparatus with the backhaul SSID to establish the wireless backhaul link with the electronic apparatus based on the backhaul SSID, wherein the wireless backhaul link is different from the onboarding wireless communication link, and wherein use of the wireless backhaul link requires the backhaul SSID; and
  after establishing the wireless backhaul link, end the extender onboarding process, and wirelessly communicate with the electronic apparatus via the wireless backhaul link.

* * * * *